United States Patent Office.

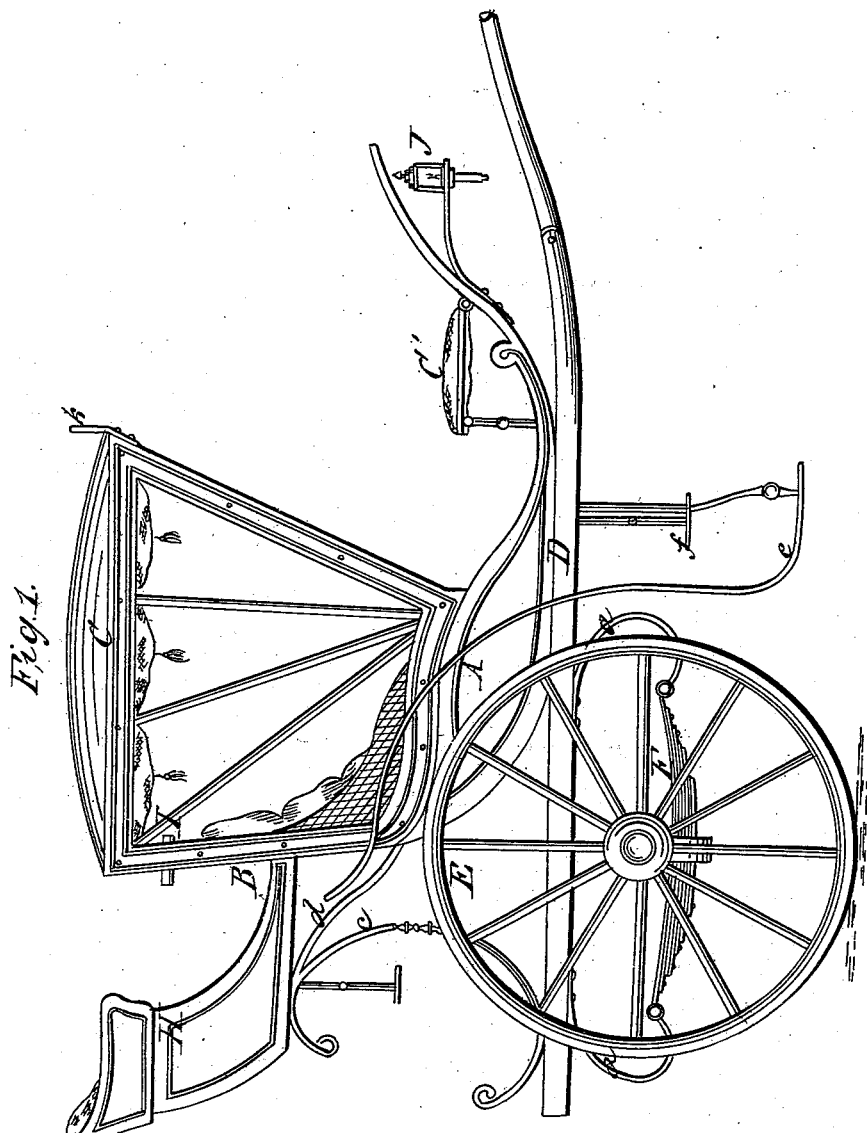

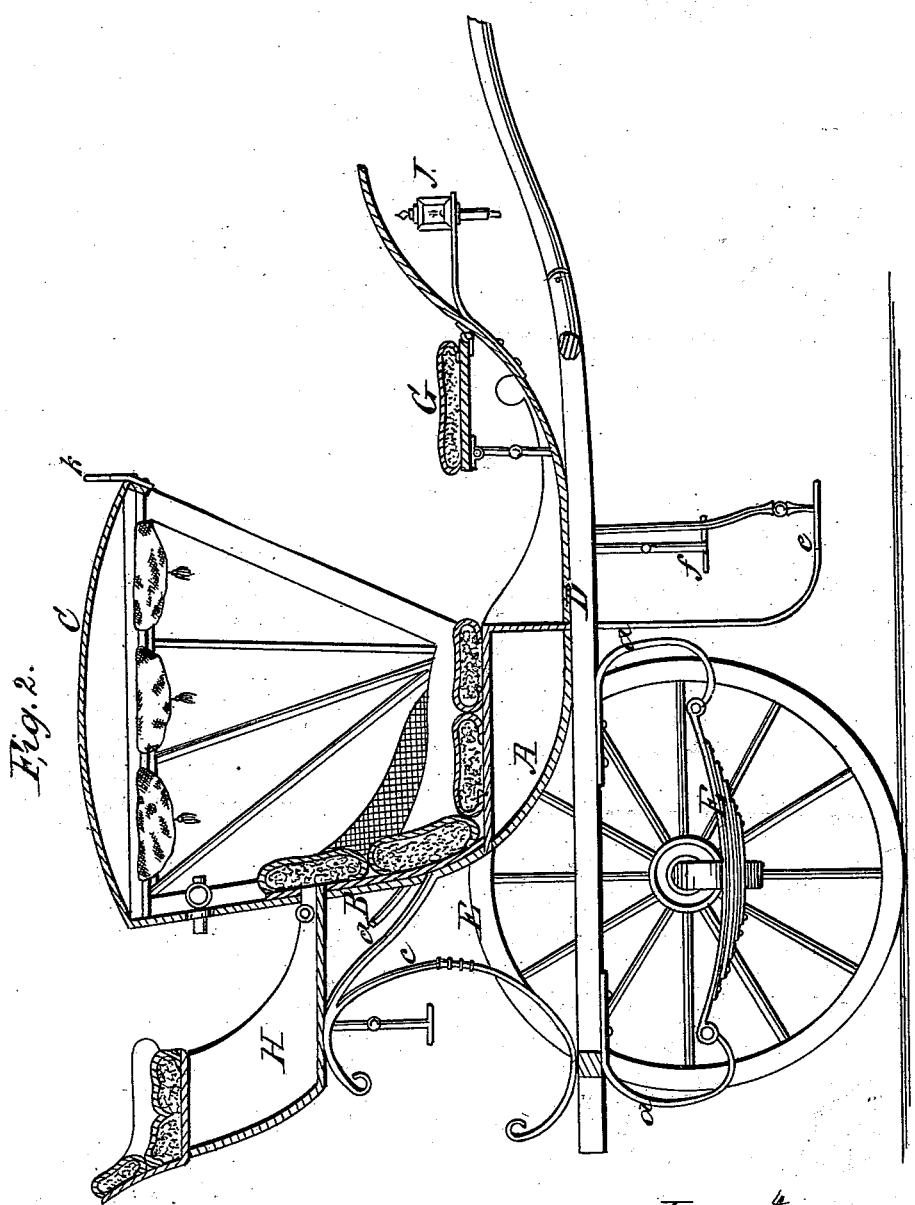

JOHN POL, OF NEW YORK, N. Y.

Letters Patent No. 61,685, dated January 29, 1867.

---

IMPROVEMENT IN CABS.

---

*The Schedule referred to in these Letters Patent and making part of the same.*

---

TO ALL WHOM IT MAY CONCERN:

Be it known that I, JOHN POL, of the city, county, and State of New York, have invented a new and useful Improvement in Cabs; and I do hereby declare that the following is a full, clear, and exact description thereof, which will enable those skilled in the art to make and use the same, reference being had to the accompanying drawings, forming part of this specification, in which—

Figure 1 is a side elevation of a cab, with my improvement applied to it.

Figure 2 is a vertical central section of the same.

Similar letters of reference indicate corresponding parts.

This invention relates more particularly to that class of vehicles intended for use as hackney carriages or cabs.

To enable others to understand my invention, I will now proceed to describe it.

A designates the body of the cab; B the back, and C the top thereof; the whole being supported on the shafts D of the cab. The vehicle is intended to be provided with but two wheels, E, one on each side, and each somewhat in the rear of the body of the cab. F is the spring which supports the shafts. The ends of the spring are secured to two bent arms, $a$ $a$, whose other ends are fastened to the shafts. The springs F rest upon the axle at each side of the cab. This arrangement of springs gives to the cab an easy motion. The cab is provided with a seat, G, capable of holding two persons, or more, according to its width, and it is also provided with a folding seat, G', hinged to the dash-board, for holding one or two persons, should it be necessary to carry them. The driver's seat, H, is mounted on springs, $c$, at the back of the cab, and sufficiently high to enable the driver to see the horses over the top of the cab. The spring $c$ is a curved spring, one part resting upon the shaft at its rear end, and the other being secured to the under side or bottom of the driver's seat, and in order to provide a suitable support for the spring, the rear part of the shaft D or of its frame is extended far enough behind the axle of the vehicle to furnish such support, without causing an undue strain on the body A, as would be done if the seat H were wholly suspended by brackets from the body. A brace, $d$, connects the spring $c$ to the back of the cab. This arrangement of the springs $c$ and braces $d$ will be clearly understood by reference to both figures. By this arrangement of the driver's seat he can, by leaning forward or bending backward, counterbalance the weight of the persons riding in the cab, as can be readily understood. I is a speaking-tube or whistle protruding through the back of the cab, to enable those inside to hold communication with the driver. And in addition to this, an opening or "pigeon-hole," (as such openings are called in omnibuses,) is provided through which the passengers can hand their fares to the driver. The cab is provided with a lantern, J, which is arranged in front of the dash-board of the cab, and also with suitable steps, $e f$, to provide an easy ascent to and descent from the cab. The reins are held in any suitable device, K, secured to the top of the cab. This cab will be found a very easy-riding and convenient vehicle for use in large cities (like the London cabs) for carrying persons to different parts of the city, at stated rates of fare.

What I claim as new, and desire to secure by Letters Patent, is—

The arrangement, in covered cabs, of a driver's seat behind the body of the cab, resting on a spring $c$, formed as here shown, and supported on a rear extension of the frame of the vehicle, and also a supplementary seat next the dash-board, and also an opening in the back of the cover to permit communication between the driver and passengers, when the several parts are arranged in the manner here shown.

JOHN POL.

Witnesses:
ARTHUR CUYAS, Jr.,
M. M. LIVINGSTON.